TAPE RECORDING AND REPRODUCING APPARATUS
Original Filed Nov. 29, 1963
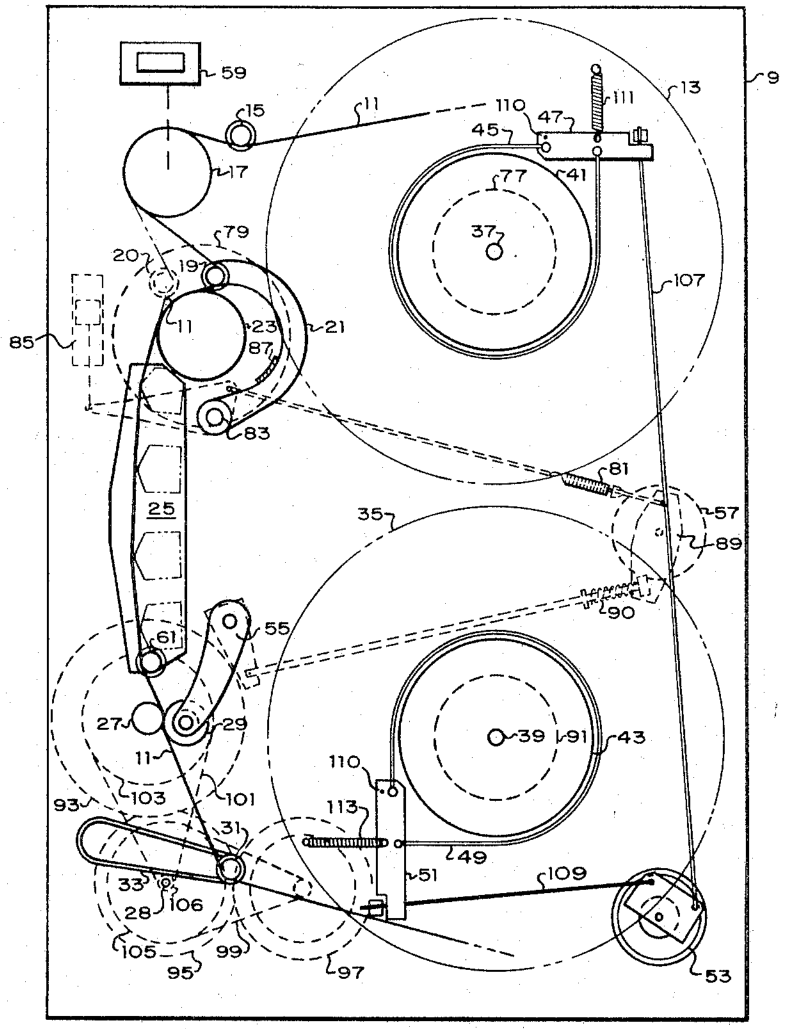
INVENTORS
WALTER T. SELSTED
WILLIAM I. GIRDNER
BY A. C. Smith United States Patent Office 3,295,780
Patented Jan. 3, 1967

3,295,780

TAPE RECORDING AND REPRODUCING APPARATUS

Walter T. Selsted, Woodside, and William I. Girdner, Portola Valley, Calif., assignors to Hewlett-Packard Company, Palo Alto, Calif., a corporation of California Original application Nov. 29, 1963, Ser. No. 326,811. Divided and this application Sept. 10, 1965, Ser. No. 486,338
3 Claims. (Cl. 242—55.12)

This is a divisional application of our application serial number 326,811 entitled Tape Recording and Reproducing Apparatus, filed November 29, 1963.

This invention relates to improved tape recording and reproducing apparatus.

It is an object of the present invention to provide an improved braking system for the tape reels of tape recording and reproducing apparatus.

Other and incidental objects of the present invention will be apparent from a reading of this specification and an inspection of the accompanying drawing which shows a top view of the tape recording and reproducing apparatus showing the location of components on the base plate.

Referring now to the drawing, the tape recording and reproducing apparatus is shown assembled on base plate 9. The tape 11 from supply reel 13 follows a path around guide 15, roller 17, guide 19 mounted on rotatable arm 21, the flywheel roller 23 and through the assembly of signal transducer heads 25. The tape 11 is pulled through this path by the capstan drive which includes the capstan shaft 27 and pinch roller 29. The tape 11 then follows the path around guide 31 mounted on rotatable arm 33 to the takeup reel 35. The supply reel 13 is mounted on the rotatable shaft 37 of motor 77. The brakeband 45 which has both of its ends mounted on a pivotal arm 47 is disposed around substantially the entire periphery of brakedrum 41. The pivotal arm 47 is actuated by spring 111 when the holdoff solenoid 53 is deenergized. A similar brake mechanism including brakeband 49 having its both ends mounted on pivotal arm 51 and disposed around substantially the entire periphery of brakedrum 43 is provided for takeup reel 35. This brake is actuated by spring 113 when solenoid 53 is deenergized. The pinch roller 29 mounted on rotatable arm 55 and tape guide 19 mounted on rotatable arm 21 are actuated by solenoid 57. A footage counter 59 is mechanically driven from the roller 17 and thus provides an indication of the number of feet of tape 11 passing over roller 17.

The supply reel 13 and takeup reel 35 are each attached to brakedrums 41, 43 mounted on the shafts 37, 39 or drive motors 77, 91 associated with each of the reels, as shown in FIGURE 1. The brake mechanisms are held in the inoperative condition by the solenoid 53 through connecting linkages 107 and 109. When the solenoid 53 is deenergized, the brakes are pulled into engagement with brakedrums 41, 43 by springs 111, 113. Both ends of the brake bands 45, 49 are connected to lever arms 47, 51 at different arm lengths about the pivots, thereby providing braking torques which are substantially independent of changes in the coefficient of friction between the drum surfaces and the brake bands and which are greater in one rotation direction than in the other rotation direction. This is because an increase in the coefficient of braking friction causes an increase in the force exerted on the spring through the lever arm as a result of the pull exerted on the brake band in the direction of rotation. As the spring stretches, the brake band unwraps from the brake drum, thereby compensating for the increase in braking friction. Conversely, if the braking friction decreases, less stretching force is exerted on the spring and the brake band thus wraps more tightly around the brake drum. The product of the coefficient of braking friction and the force with which the brake band is urged against the brake drum thus remains substantially constant.

The braking torque is greater in one rotation direction than in the other direction because of the dissimilar lever arm distances through which the spring exerts force on the ends of the brake bands. It can be seen that the spring force exerted on the end of brake band 45 which is pulled by counterclockwise rotation of brake drum 41 is multiplied by the ratio of lever arm distances about the pivot 110 while the spring force exerted on the end which is pulled by clockwise rotation of the brake drum 41 is substantially the spring force itself. A similar brake mechanism including brake drum 43 and brake band 49 is provided for the takeup reel 35 and is arranged to produce the greater braking torque in a rotation direction which is opposite to that direction for which the supply reel brake mechanism produces the greater braking torque. Brakes arranged in this manner tend to enable the reel from which tape is unwinding to decelerate more rapidly than the remaining reel, thereby maintaining tension on the tape. Also brakes arranged in this manner eliminate the backlash commonly encountered in conventional brake mechanisms following reversal of the direction of braking or following initial engagement of the brake band and brake drum.

We claim:

1. In tape recording and reproducing apparatus having a reel of tape, braking means for said reel comprising:
  - a brake drum disposed to rotate with said reel;
  - a brake band disposed about a portion of the periphery of said drum;
  - a pivoted arm;
  - means attaching the ends of said band to said arm at dissimilar distances from said axis at locations and at locations thereon which move both ends of said band in band-tightening directions about said drum in response to rotation of said arm in a selected direction about said pivot axis; and
  - means to rotate said arm in said selected direction about the pivot thereof for actuating said braking means.

2. In tape recording and reproducing apparatus having a reel of tape, braking means for said reel comprising:
  - a brake drum disposed to rotate with said reel;
  - a brake band disposed about a portion of the periphery of said drum;
  - an arm pivotable about an axis;
  - means attaching the ends of said band to said arm at dissimilar distances from said axis at locations thereon which move both ends of said band in band-tightening directions about said drum in response to rotation of said arm in a selected direction about said pivot axis;
  - means urging said arm in said selected direction to tighten the band about said drum; and
  - means attached to said arm for urging said arm in a direction to move the ends of said band in band-expanding directions about said drum.

3. In tape recording and reproducing apparatus having a tape supply reel and a takeup reel, braking means for said reels comprising:
  - a brake drum for each of said reels disposed to rotate therewith;
  - and for each of said brake drums, a brake band disposed about a portion of the periphery of said drum;
  - an arm pivotable about an axis;
  - means attaching the ends of said band to said arm at dissimilar distances from the pivot axis of said arm and at locations thereon which move both ends of said band in band-tightening directions about said drum in response to rotation of said arm in a selected direction about said pivot axis;

means urging said arm in said selected direction to tighten the band about said drum;

the braking means for each reel providing greater braking torque in one direction of drum rotation than in the opposite direction;

the braking means for one reel being disposed to exert greater braking torque in a direction of drum rotation opposite to the direction of drum rotation in which the braking means for the other reel exerts the greater braking torque; and means attached to said arms for simultaneously urging said arms in directions to move the ends of said bands in band-expanding direction about said drums.

References Cited by the Examiner

UNITED STATES PATENTS

| | | | |
|---|---|---|---|
| 2,781,186 | 2/1957 | Harbers et al. ______ | 188—77 X |
| 3,075,716 | 1/1963 | Morgan __________ | 242—55.12 |

FRANK J. COHEN, *Primary Examiner.*

LEONARD D. CHRISTIAN, *Examiner.*

UNITED STATES PATENT OFFICE

CERTIFICATE OF CORRECTION

January 3, 1967

Patent No. 3,295,780

Walter T. Selsted et al.

It is hereby certified that error appears in the above numbered patent requiring correction and that the said Letters Patent should read as corrected below.

Column 2, line 38, strike out "said axis at locations", and insert instead -- the pivot axis of said arm --.

Signed and sealed this 26th day of September 1967.

(SEAL)
Attest:

ERNEST W. SWIDER
Attesting Officer

EDWARD J. BRENNER
Commissioner of Patents